(12) United States Patent
Ohta (10) Patent No.: US 7,861,086 B2
(45) Date of Patent: Dec. 28, 2010

(54) DIGITAL SIGNING METHOD, DIGITAL SIGNING APPARATUS, PORTABLE INFORMATION PROCESSING APPARATUS, DIGITAL SIGNING SYSTEM, AND RECORDING MEDIUM

(75) Inventor: Yusuke Ohta, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1164 days.

(21) Appl. No.: 11/194,536

(22) Filed: Aug. 2, 2005

(65) Prior Publication Data

US 2006/0031677 A1 Feb. 9, 2006

(30) Foreign Application Priority Data

Aug. 4, 2004 (JP) .............................. 2004-227909

(51) Int. Cl.
H04L 9/32 (2006.01)
(52) U.S. Cl. ...................................... 713/176; 709/225
(58) Field of Classification Search ................. 713/176, 713/180, 193; 709/225
See application file for complete search history.

(56) References Cited

U.S. PATENT DOCUMENTS

| 6,363,479 | B1 * | 3/2002 | Godfrey et al. | ............. 713/160 |
| 7,073,073 | B1 * | 7/2006 | Nonaka et al. | ............... 713/193 |
| 7,085,834 | B2 * | 8/2006 | Delany et al. | ................ 709/225 |
| 7,096,365 | B1 * | 8/2006 | Hamann et al. | ............. 713/180 |
| 2003/0159045 | A1 * | 8/2003 | Nishimoto et al. | ........... 713/176 |
| 2004/0039919 | A1 * | 2/2004 | Takayama et al. | ............ 713/180 |
| 2005/0108548 | A1 | 5/2005 | Ohta | |

FOREIGN PATENT DOCUMENTS

| JP | 2000-227755 | 8/2000 |
| JP | 2003-318885 | 11/2003 |

OTHER PUBLICATIONS

Mihir Bellare; A Forward-Secure Digital Signature Scheme; Year:1999; Springer Berlin / Heidelberg; vol. 1666/1999; p. 786.*
Office Action for coresponding Japanese Patent Application No. 2004-227909, issued on Aug. 31, 2010.

* cited by examiner

Primary Examiner—Kambiz Zand
Assistant Examiner—Monjour Rahim
(74) Attorney, Agent, or Firm—Oblon, Spivak, McClelland, Maier & Neustadt, L.L.P.

(57) ABSTRACT

A digital signing method in a digital signing apparatus that provides a digital signature to electronic data, including: inputting data to be signed with the digital signature; presenting attribute information of one or more signature keys; displaying said attribute information of said one or more signature keys presented to a user; creating signature data by using said inputted data and a signature key corresponding to said attribute information of signature key selected by said user from said attribute information of said one or more signature keys displayed; and saving signature data created or a signature file created based on said signature data in a storage unit.

24 Claims, 8 Drawing Sheets

You Can Use Following Keys For e-Signature.
Please Select a Key.

A. Private Key        [SELECT]
B. Manager Key     [SELECT]

[OK]        [CANCEL]

DIGITAL SIGNING METHOD, DIGITAL SIGNING APPARATUS, PORTABLE INFORMATION PROCESSING APPARATUS, DIGITAL SIGNING SYSTEM, AND RECORDING MEDIUM

BACKGROUND OF THE INVENTION

The present invention relates to digital signing method, digital signing apparatus, portable information processing apparatus, digital signing system, and recording medium carrying a digital signing program and signature data creation program.

In recent years, methods and apparatuses are disclosed for providing digital signature to digital data, especially the data electronically digitalized by reading paper document by a scanner, or the like (Patent Reference 1, for example).

Patent Reference 1 uses an IC card for the device that carry out the encrypting processing used for creating digital signature data, wherein this reference allows plural persons to provide respective digital signatures on a single document by repeatedly using the same means, in other words, by using respective IC cards.

In Patent Reference 1, it is assumed thereby that each IC card carries the key for only one digital signature.

(Patent Reference 1) Japanese Laid Open Patent Application 2003-318885 official gazette

SUMMARY OF THE INVENTION

However, in actual civil life, there arise often the cases in which a single person carries plural seals and use the seals according to the purposes or according to the situations. For example, there can be a case in which a person uses a private seal in ordinary situations but uses a special seal authenticating the power of the person in the case of making a seal on a contract document on behalf of a company.

The same situation occurs also in the use of digital signatures.

For example, there can be a situation in which a person having a public qualification of doctor signs his or her private mails electronically by using a personal signature key given to individuals while the same person uses a signature key given to the public qualification of doctor when signing in electronic care records. Only with the use of the signature key issued for the public qualification of doctor, the electronic care record bears the authority of doctor, while in the case the doctor has signed with his or her private signature key, the electronic care record is void for the authority of public qualification of doctor.

Similarly, a clerk of a government office has to use a private digital signature for private purposes and an official digital signature for official purposes.

Recently, there is a movement of submitting "E-document Bill" to the Diet and the needs for the technology enabling flexible use of digital signature is increasing.

The present invention has been made in view of the foregoing situations and circumstances and has its object of enabling a single user to use plural digital signature keys flexibly according to the purposes.

More specifically, the present invention provides a digital signing method in a digital signing apparatus that provides a digital signature to electronic data, comprising:

a signature object data inputting step for inputting data to be signed with digital signature;

a signature key presentation requesting step for requesting presentation of attribute information of one or more signature keys;

a signature key displaying step for displaying said attribute information of said one or more signature keys presented in the signature key presentation requesting step to a user;

signature data creation requesting step requesting creation of signature data by using: said electronic data inputted in said signature object data inputting step; and a signature key corresponding to said attribute information of said signature key selected by said user from said attribute information of said one or more signature keys displayed in said signature key displaying step; and a signature data saving step for saving signature data created in response to said request in said signature data creation requesting step or a signature file created based on said signature data in a storage unit.

According to the present invention, it becomes possible for a single user to use plural digital signature keys according to the purposes and circumstances, by providing a digital signing method carried out on a digital signing apparatus that provides a digital signature to electronic data, such that the digital signing method includes: a signature object data inputting step for inputting data to be signed with digital signature; a signature key presentation requesting step for requesting presentation of attribute information of one or more signature keys; a signature key displaying step for displaying said attribute information of one or more signature keys presented in the signature key presentation requesting step to a user; signature data creation requesting step requesting creation of signature data by using: said electronic data inputted in said signature object data inputting step; and a signature key corresponding to said attribute information of said signature key selected by said user from the attribute information of the one or more signature keys displayed in said signature key displaying step; and a signature data saving step for saving signature data created in response to said request in said signature data creation requesting step or a signature file created based on said signature data in a storage unit.

Here, it should be noted that the foregoing attribute information of signature key corresponds for example to the profile information of signature key attached to the signature key, as will be described later in the embodiments of the present invention.

Further, the present invention provides a digital signing apparatus, portable information processing apparatus, a digital signing system, a digital signing program, a signature data creation program, and also a recording medium storing such digital signing program or signature data creation program.

According to the present invention, it becomes possible for a single user to use plural digital signature keys appropriately according to the purposes or circumstances.

DETAILED DESCRIPTION OF THE INVENTION

Hereinafter, an embodiment of the present invention will be explained with reference to the drawings.

Embodiment 1

Figure 1:
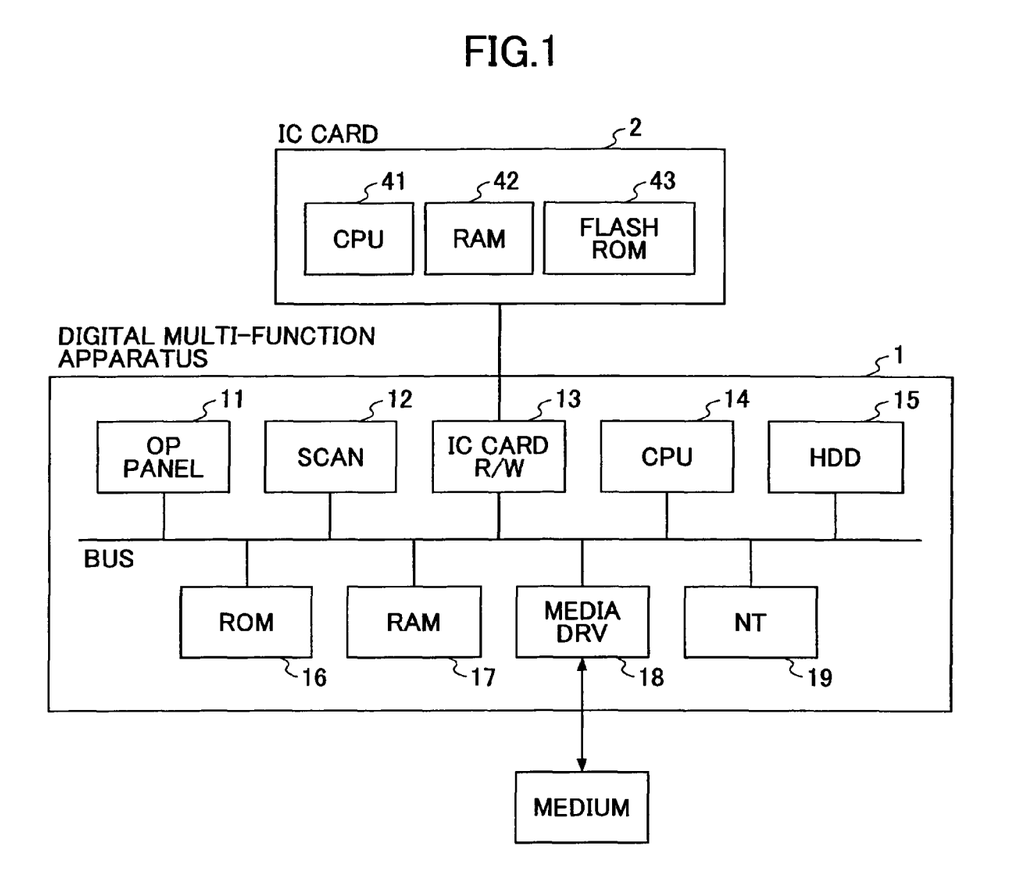
FIG. 1 is a diagram showing the hardware construction of an exemplar digital signing system.

FIG. 1 is a hardware construction diagram showing an example of digital signing system.

As shown in FIG. 1, the digital signing system includes a digital multifunction apparatus 1 and an IC card 2, wherein the digital multifunction apparatus 1 includes: an operation panel 11, an image scanner 12, an IC card read/write unit 13, a CPU 14, a hard disk drive 15, a ROM 16, a RAM 17, a media drive 18 and a network adapter 19, while the IC card 2 includes a CPU 41, a RAM 42 and a flash ROM 43.

The operation panel 11 accepts input operation from the operator and carries out display to the operator. On the other hand, the image scanner 12 reads a paper document and creates an electrons document. Further, the IC card read/write unit 13 reads data from the IC card 2 and writs data to the IC card 2. The IC card 2 may be an ordinary IC card used for recording information or data or a multiple application IC card.

The CPU 14 controls the digital multifunction apparatus 1 according to a program (digital signing program) stored in the RAM 17. The hard disk drive 15 stores the program (digital signing program), signature files, signature data, and the like. The ROM 16 stores data, and the like. The RAM 17 reads out the program (digital signing program) at the time of activation of the digital multifunction apparatus 1 from the hard disk drive 15 and holds the program thus read out, or stores the object data to which the digital signature is to be made. Further, the RAM 17 is used for storing message digests.

The media drive 18 is used for reading and writing from and to a recording medium such as floppy-disk (trade mark), CD-R disk, or the like. The program (digital signing program) of the digital multifunction apparatus 1 may be stored in the hard disk drive 15 from the beginning, or it may be installed in the hard disk drive 15 from the recording medium via the media drive 18. The network adapter 19 connects the digital multifunction apparatus 1 to a network. Further, the program (digital signing program) of the digital multifunction apparatus 1 may be downloaded from network through the network adapter 19 and stored in the hard disk drive 15 subsequently.

Similarly, the CPU 41 controls the IC card 2 according to the program (signature data creation program) included in the signature data creation part 25 held in the RAM 42 as will be describe later and/or the program corresponding to the signing application included in the signature data creation part 25. Further, the flash ROM 43 stores signature keys, the program (signature data creation program), and the like.

For example, when the IC card 2 has received a command from the digital multifunction apparatus 1 via the IC card read/write unit 13, the RAM 42 reads out the program (signature data creation program) from the flash ROM 43 and holds the program thus read out therein.

Figure 2:
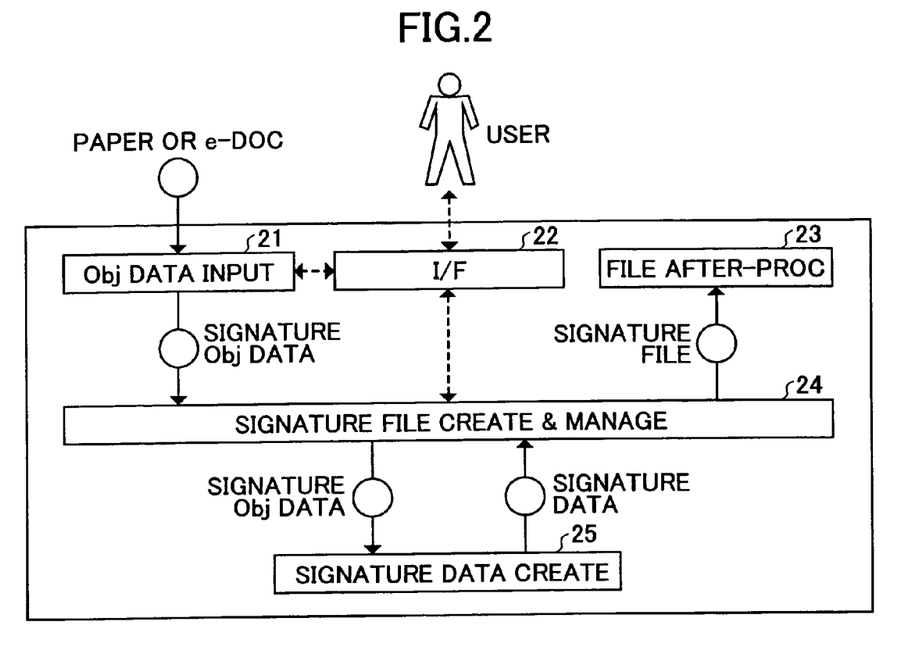
FIG. 2 is a first function diagram of the digital signing system.

The functional construction of an exemplar digital signing system is shown in FIG. 2, wherein it should be noted that FIG. 2 is a first functional diagram of the digital signing system.

As shown in FIG. 2, the digital signing system includes: an object data input part 21; an interface part 22, a file after-processing part 23; a signature file creation managing part 24; and a signature data creation part 25. In FIG. 2, the arrows of unbroken line represent movement of main data while the arrows of broken line represent delivery of parameters and instructions.

It should be noted that all of the object data input part 21, the interface part 22, the file after-processing part 23, the signature file creation managing part 24 and the signature data creation part 25, shown in FIG. 2 may be included in the digital multifunction apparatus 1, or alternatively, it is possible to construct such that only the signature data creation part 25 is included in the IC card 2.

The interface part 22 may receive the instruction for digital signature from the user, or display the available digital signature key to the user, or receive the selection result of the digital signature key from the user. For example, the operation panel 11 of FIG. 1 corresponds to the interface part 22.

It should be noted that the object data input part 21 is used for inputting the object data to be provided with the digital signature. This data will be called hereinafter as signature object data. For example, in the case of inputting a paper document after transformation to electronic data, the image scanner 12 of FIG. 1 corresponds to the object data input part 21. Further, in the case of inputting the document held (or saved) in the hard disk drive 15, or the like, of the digital multifunction apparatus 1 already in the form of electronic document, or in the case of reading out the electronic document from the hard disk drive 15, or the like, or in the case of inputting the document stored in an electronic document storage server, or the like, connected to the digital multifunction apparatus 1 via a network, it is the process of acquiring, via the network, the electronic document from the electronic document storage server, or the like, that corresponds to object data input part 21.

The signature file creation managing part 24 is a managing part that manages the processing related to digital signature creation. For example, the signature file creation managing part 24 performs various functions such as: inquiring the candidacy of possible signature key to the electrons signature data creation part 25; urges the user for selection of key via the interface part 22; asks the digital signature data creation part 25 for creation of the digital signature data; and creates the digital signature file of file form based on the created digital signature data.

The signature data creation part 25 is a creation part that crates the signature data (the signature object data subjected to encrypting processing with the digital signature key). The plural signature keys are held in the signature data creation part 25. In the case of using the IC card 2, for example, the card application stored in the IC card 2 corresponds to the signature data creation part 25. Conversely speaking, the card application corresponding to the signature data creation part 25 is stored in the IC card 2.

The file after-processing part 23 is a processing part for processing the digital signature file created in the digital signature file creation managing part 24. For example, the file after-processing part 23 saves the digital signature file in a recording medium such as the hard disk drive 15 of the digital multifunction apparatus 1, or transfers the same to the file control server, or the like, connected to the digital multifunction apparatus 1 via the network and requests saving.

With the functional construction of the digital multifunction apparatus 1 shown in FIG. 2, the data input via the object data input part 21 is forwarded to the signature data creation part 25 via the signature file creation managing part 24. However, in the case of doing digital signature it is generally practiced to use a method in which encrypting processing is performed after transforming the signature object data to small size data called message digest (MD) by applying thereto a one-way function (hash function, for example).

Therefore, it is also possible to include an object data preprocessing part 26 that implements the one-way function in the functional construction of the digital multifunction apparatus 1.

Figure 3:
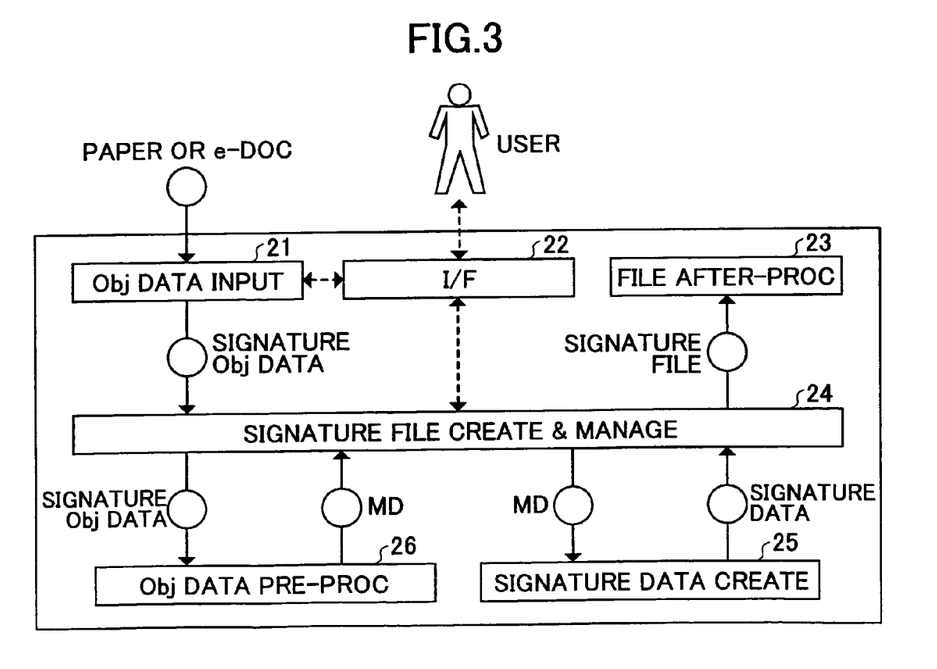
FIG. 3 is a second functional diagram of the digital signing system.

Another example of the functional construction of the digital signing system is shown in FIG. 3, wherein FIG. 3 is a second functional diagram of the digital signing system.

As shown in FIG. 3, the digital signing system includes the object data input part 21, the interface part 22, the file after-processing part 23, the signature file creation managing part 24, the signature data creation part 25, and the object data preprocessing part 26. Similarly to FIG. 2, the arrows of unbroken line of FIG. 3 represent movement of main data while the arrows of broken line represent delivery of parameters and instructions.

It should be noted that all of the object data input part 21, the interface part 22, the file after-processing part 23, the signature file creation managing part 24 and the signature data creation part 25, shown in FIG. 2 may be included in the digital multifunction apparatus 1, or alternatively, it is possible to construct such that only the signature data creation part 25 is included in the IC card 2.

As mentioned above, the object data preprocessing part 26 implements the one-way function and transforms the signature object data into small size data called the message digest.

Hereinafter, for the sake of simplicity of explanation, the digital signing system will be explained for the case in which the system has the functional construction of object data preprocessing part 26 as shown in FIG. 3. However, this does not limit the scope of the present invention.

Figure 4:
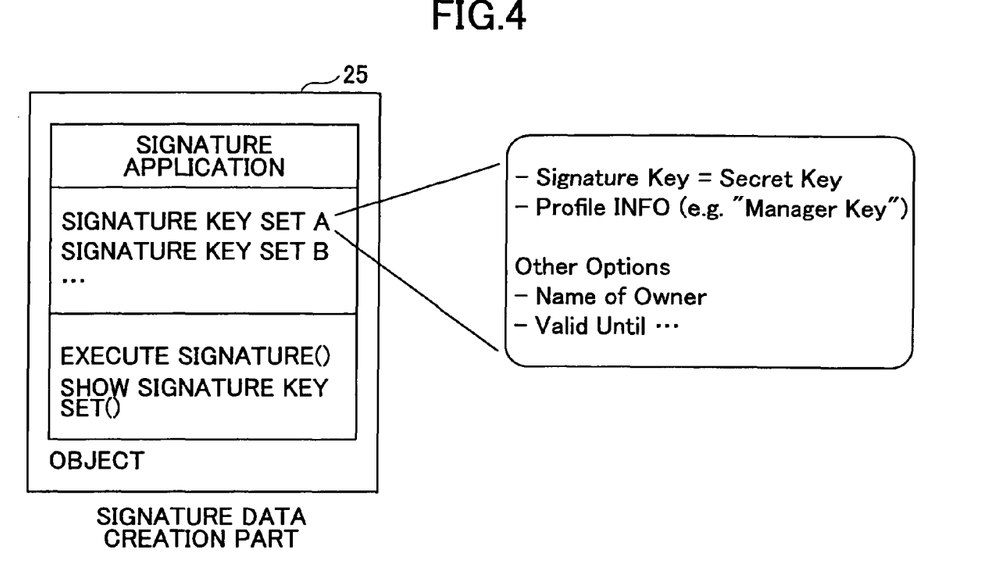
FIG. 4 is a first diagram showing an interior construction of a signature data creation part.

FIG. 4 shows an example of interior construction of the signature data creation part 25, and thus, FIG. 4 is a first diagram showing the interior construction of the signature data creation part.

As a method of realizing the signature data creation part 25 shown in FIG. 2 or FIG. 3, there is a method of constructing the signature data creation part 25 by a single object (single card application in the case of constructing the signature data creation part 25 with card application).

When constructing the signature data creation part 25 with single object (or single card application) like this, the object (or card application) has plural signature key sets as the data and a signature implementation method implementing the encrypting processing by the specified key and a signature key list presentation method presenting the profile information of possible signature keys in the form of list as the method (or function), as shown in FIG. 4. Here, the signature key set means a data set that includes the secret key used for encrypting processing of the digital signature and the profile information with regard to the secret key (information such as "key for the general manager" or "key for private") as the elements thereof.

By constructing the signature data creation part 25 as shown in FIG. 4, it becomes possible to present the profile information of possible plural signature keys as per request.

Figure 5:
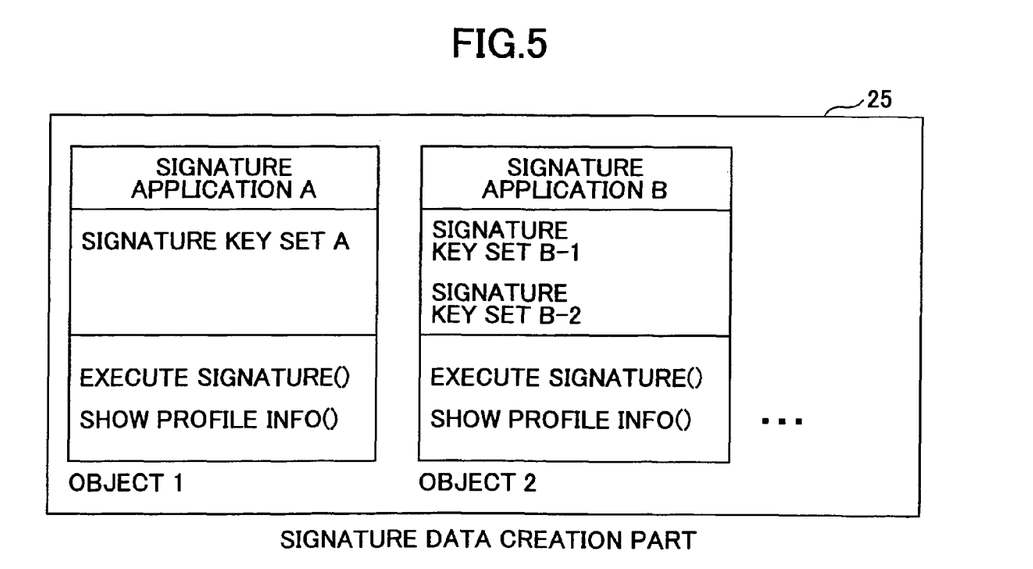
FIG. 5 is a second diagram showing the interior construction of the signature data creation part.

Another example of the internal construction of the signature data creation part 25 is shown in FIG. 5, and thus, FIG. 5 is a second diagram showing the interior construction of the signature data creation part.

FIG. 4 shows an example in which the signature data creation part 25 is formed with a single object (or card application) having plural signature key sets. It should be noted that the construction of FIG. 4 can be realized by using an ordinary IC card of non-multiple application type IC card. On the other hand, it is possible to construct the signature data creation part 25 with plural objects (or card applications) having one or more signature key sets as shown in FIG. 5. In the case of realizing the construction shown in FIG. 5 with an IC card, it is necessary to use a multiple application IC card, not an ordinary IC card.

In the case of constructing the signature data creation part 25 with plural objects (or card applications), each of the objects (or card applications) has one or more signature key sets as the data and a signature implementation method for implementing the encrypting processing by the specified key and a signature key profile information presentation method for presenting the profile information of possible signature keys as the method (or function), as shown in FIG. 5.

In the case of using the construction shown in FIG. 5, the signature file creation managing part 24 may know the available object (or card application) of the signature data creation part 25, on the basis of the setting file, or the like, set up in the signature file creation managing part 24. Alternatively, it is possible to implement an object (or card application) that presents an available object (or card application) in the signature data creation part 25 and know the available object (or card application) of the signature data creation part 25 via the object (or card application).

The signature file creation managing part 24 can use the method of an object (or card application) by knowing the object (or card application) of available signature data creation part 25. There may be one such available object (or card application) of the signature data creation part 25 or there may be plural such available objects. In the case there is on object (or card application) in the signature data creation part 25 available by the signature file creation managing part 24 and in the case that object (or card application) has only one set of signature key, there is no need for the user to designate the signature key.

By constructing the signature data creation part 25 as shown in FIG. 5, too, it becomes possible to present the profile information of plural possible signature keys according to request, for example.

Figure 6:
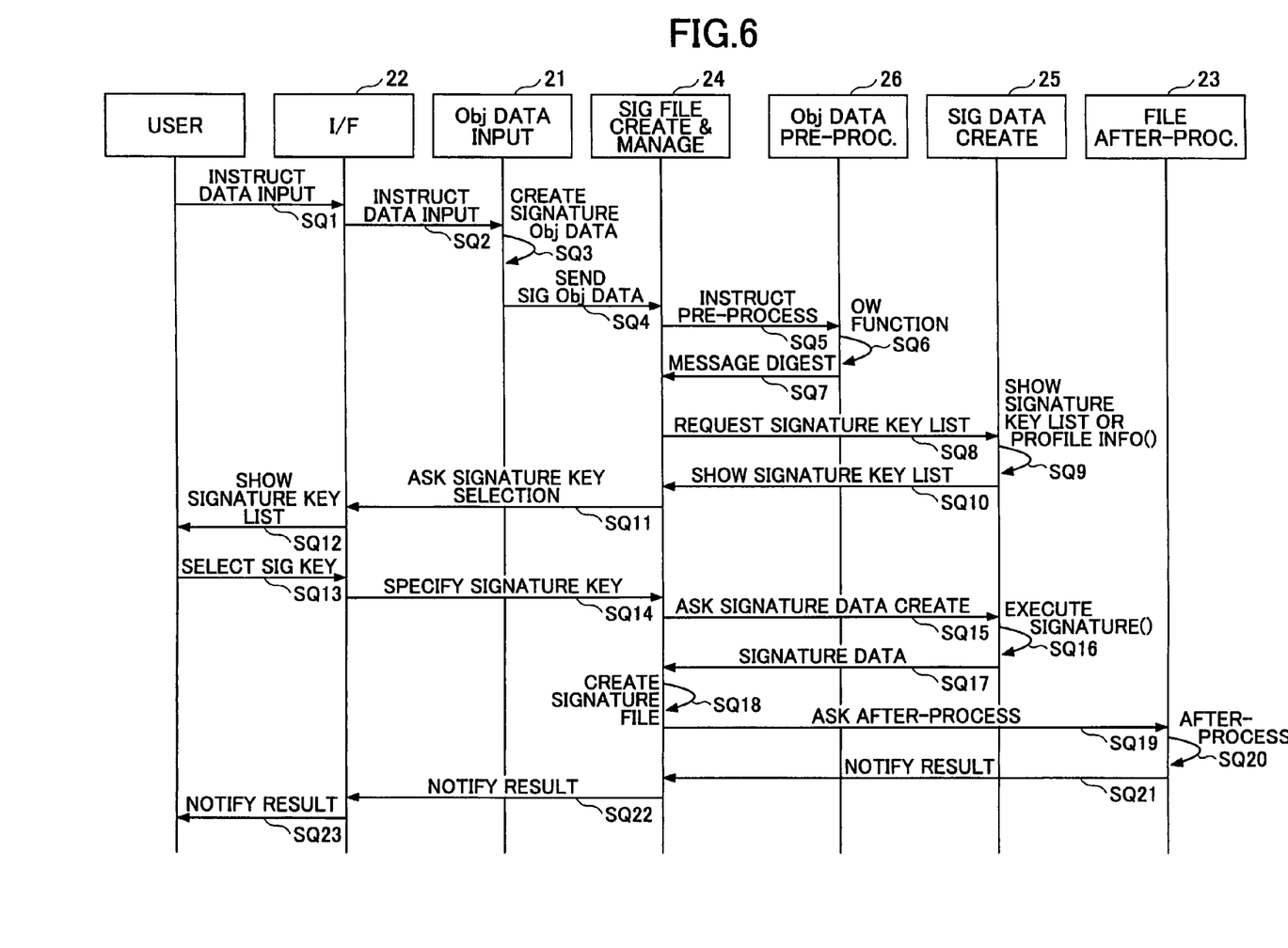
FIG. 6 is a first sequence diagram of a digital signature processing.

An example of digital signature processing is shown in FIG. 6, and thus, FIG. 6 forms a first sequence diagram of digital signature processing.

FIG. 6 shows an example in which the user selects one signature key from the two signature keys stored in the IC card 2 for an electronic document created by scanning a paper document with the image scanner 12 by using the operation panel 11, or the like and saves the electronic document in the hard disk drive 15 inside the digital multifunction apparatus 1 with the digital signature. Hereinafter, explanation will be made for the case in which the two signature keys have the profile information in the form of the name of the keys ("key for general manager" and "key for private", for example). Further, in FIG. 6, it is assumed that the signature data creation part 25 shown in FIG. 3 is implemented in the IC card 2 and that the object data input part 21, the interface part 22, the file after-processing part 23, the signature file creation managing part 24 and the object data preprocessing part 26 are implemented in the digital multifunction apparatus 1.

First, the user carries the IC card 2 and the paper document to be scanned to the digital multifunction apparatus 1, inserts the IC card 2 into the IC card read/write unit 13.

Next, the user sets the paper document on the image scanner 12, and switches the digital multifunction apparatus 1 to scanner mode by using the operation panel 11. Further, the user designates "scan with digital signature option" and starts scanning (sequence SQ1 of FIG. 6). For the operation panel 11, it is possible to use a liquid crystal display having touch function, for example.

When data input is instructed by the user, the interface part 22 informs to the object data input part 21 that data input was instructed by the user (sequence SQ2 of FIG. 6).

The object data input part 21 creates, when it is informed from the interface part 22 that data input was instructed by the user, the signature object data by reading the paper document set by the user (sequence SQ3 of FIG. 6), and delivers the same to the signature file creation managing part 24 (sequence SQ4 of FIG. 6).

The signature file creation managing part 24 expands the signature object data delivered from the object data input part 21 on the RAM 17 and instructs pre-processing to the object data preprocessing part 26 (Sequence SQ5 of FIG. 6).

The object data preprocessing part 26 applies the one-way function to the signature object data instructed by the signature file creation managing part 24 for the processing (sequence SQ6 of FIG. 6) and creates a message digest of the signature object data. Further, the object data preprocessing part 26 expands the message digest on the RAM 17 and returns the message digest to the signature file creation managing part 24 (sequence SQ7 of FIG. 6).

On the other hand, the signature file creation managing part 24 delivers a signature key listing request for calling the signature key list presentation method of the object (or card application) inside the IC card 2 or the signature key profile information presentation method of one or more objects (or card application) within the IC card 2 via the IC card read/write unit 13 (sequence SQ8 of FIG. 6).

In the case the IC card 2 is a multiple application IC card, the signature file creation managing part 24 may deliver the signature key listing request to the signature data creation part 25 by including the application identifier for distinguishing the available object (or card application) in the multiple application IC card, in the signature key listing request.

In the case the IC card 2 has the construction shown in FIG. 4, the signature data creation part 25 executes, upon reception of the signature key listing request from the signature file creation managing part 24, the signature key list presentation method of the corresponding object (or card application) (sequence SQ9 of FIG. 6) and collects the profile information from the signature key set of the corresponding object (or card application). Further, the signature data creation part 25 presents the profile information thus collected to the signature file creation managing part 24 as signature key list (sequence SQ10 of FIG. 6).

On the other hand, in the case the IC card 2 has the construction shown in FIG. 5, the signature data creation part 25 executes, upon reception of the signature key listing request from the signature file creation managing part 24, the signature key profile information presentation method of corresponding plural objects (or card applications) (sequence SQ9 of FIG. 6), and collects the profile information from the plural corresponding objects (or card applications). Further, the signature data creation part 25 presents the profile information thus collected to the signature file creation managing part 24 as the signature key list (sequence SQ10 of FIG. 6). In the description hereinafter, it is assumed that the signature data creation part 25 executes, in response to the request from the signature file creation managing part 24, the signature key profile information presentation method of plural objects (or card applications), collects the profile information from the plural objects (or card applications), and presents the profile information thus collected to the signature file creation managing part 24 as the signature key list, for the sake of simplification of explanation.

It should be noted that the signature data creation part 25 may present the profile information to the signature file creation managing part 24 by including an identifier of the key (such as key number).

Upon receipt of presentation of the signature key list from the signature data creation part 25, the signature file creation managing part 24 asks for selection of the signature key to the interface part 22 (sequence SQl1 of FIG. 6).

Figure 7:
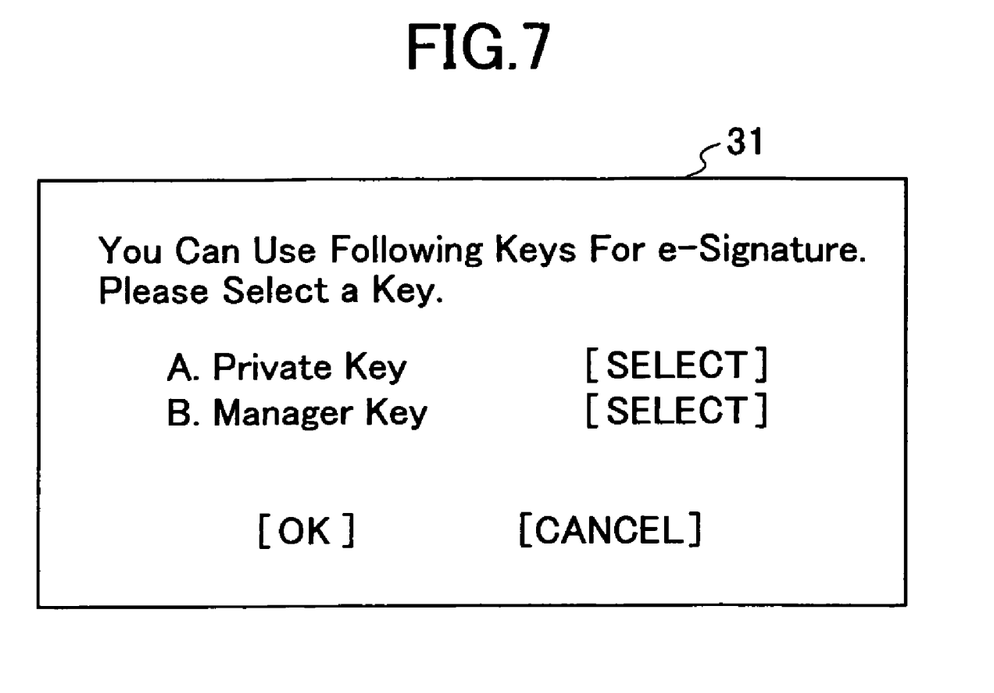
FIG. 7 is a first diagram showing a signature key listing display screen.

Upon receipt of the selection request of signature key from the signature file creation managing part 24, the interface part 22 creates a signature key list display screen 31 as shown in FIG. 7 and displays the same on the operation panel 11 (sequence SQ12 of FIG. 6). FIG. 7 is a first diagram showing the signature key list display screen.

As shown in FIG. 7, the signature key list display screen 31 displays a list of the signature keys available for digital signature. In addition to the list of the signature keys, it is also possible to display the name and authority or title of the user as a part of the profile information. As mentioned above, the profile information is displayed on the screen by being provided to the interface part 22 via the signature file creation managing part 24 as a return value of the signature key list presentation method.

The user refers to the signature key list display screen 31 such as the one shown in FIG. 7 and selects an appropriate signature key (sequence SQ13 of FIG. 6). Thereby, the user selects, for example, the key for private use for the case of providing a digital signature to a private document and selects the key of general manager when to provide a digital signature to the document with the power of general manager.

When a signature key is selected by the user, the interface part 22 delivers the profile name of the key and/or the identifier of the key selected by the user to the signature file creation managing part 24 (sequence SQ14 of FIG. 6).

Upon reception of the profile name of the key and/or the identifier of the key selected by the user from the interface part 22, the signature file creation managing part 24 delivers a signature data creation request that calls the signature implementation method of the object (or card application) inside the IC card 2 to the signature data creation part 25 via the IC card read/write unit 13 while using the profile name and/or the identifier of the key and further the corresponding Message digest held on the RAM17 as a parameter (sequence SQ15 of FIG. 6).

Upon reception of the signature data creation request from the signature file creation managing part 24, the signature data creation part 25 executes the signature implementation method of the corresponding object (or card application) on the basis of the parameter (sequence SQ16 of FIG. 6) and returns the signature data to the signature file creation managing part 24 as the result of execution (sequence SQ17 of FIG. 6). For example, the signature implementation method encrypts the message digest according to the RSA 1024-bit method, or the like, while using the signature key, which is distinguished by the profile name and/or the identifier of the key provided as the parameter.

Upon reception of the signature data form the signature data creation part 25, the signature file creation managing part 24 files the signature data and creates a signature file (sequence SQ18 of FIG. 6) and delivers the request of post-processing including the signature file, to the file after-processing part 23 (sequence SQ19 of FIG. 6).

Upon reception of the request of post-processing from the signature file creation managing part 24, the file after-processing part 23 stores the signature file included in the request of the post-processing in a specified location of the hard disk drive 15 (sequence SQ20 of FIG. 6) and notifies the result of the post-processing (completion of saving, for example) to the signature file creation managing part 24 (sequence SQ21 of FIG. 6). Here, it should be noted that the specified location of the hard disk drive 15 means for example a private folder of the user who had carried out the scanning.

Upon reception of the notification of result from the file after-processing part 23, the signature file creation managing part 24 notifies the result to the interface part 22 (sequence SQ22 of FIG. 6).

Further, upon reception of the notification of result from the signature file creation part 24, the interface part 22 displays the result on the operation panel 11 (sequence SQ23 of FIG. 6).

By carrying out the processing shown in FIG. 6, it becomes possible for a single user to use plural digital signature keys in digital signature according to the purposes and situations.

Although the user has to make decision whether or not to provide digital signature to the data at the time the user inputs data in the example of FIG. 6, it is also possible to configure such that the user can decide whether or not to provide the digital signature to the data after inputting the data and the electronic data has been created in the digital multifunction apparatus 1. Further, in the case the scanning is conducted after the user has selected not to provide digital signature, the process sequences SQ5-SQ18 of FIG. 6 can be omitted from the process sequence.

Further, while explanation has been made in FIG. 6 that the signature file creation managing part 24 delivers the signature key listing request for calling the signature key list presentation method or the signature key profile information presentation method to the signature data creation part 25 in the sequence SQ8, it is also possible to implement such that the signature file creation managing part 24 delivers the signature key listing request for calling the signature key list presentation method always to the signature data creation part 25 and the signature data creation part 25 calls a dummy signature key list presentation method in the case the signature data creation part 25 has the construction shown in FIG. 5. Thereby, the dummy signature key list presentation method calls the signature key profile information presentation method of one or plural objects (or card applications). With this implementation, there is no need in the signature file creation managing part 24 to worry about whether the signature data creation part 25 has the construction shown in FIG. 4 or the construction shown in FIG. 5. This applies also to the embodiments to be explained below.

Hereinafter, embodiments different from Embodiment 1 will be explained.

Embodiment 2

As shown in FIG. 6 Embodiment 1 has been implemented such that the signature file creation managing part 24 requests presentation of the signature key list (and/or list of the profile information) to the signature data creation part 25 and the received signature key list (and/or the list of the profile information) is shown to the user via the interface part 22 for selection, after that the data input has occurred, while it is also possible that the data input is conducted after the signature file creation managing part 24 has displayed the signature key list (and/or list of the profile information) to the user via the interface part 22 in response, for example to the request from the user.

Figure 8:
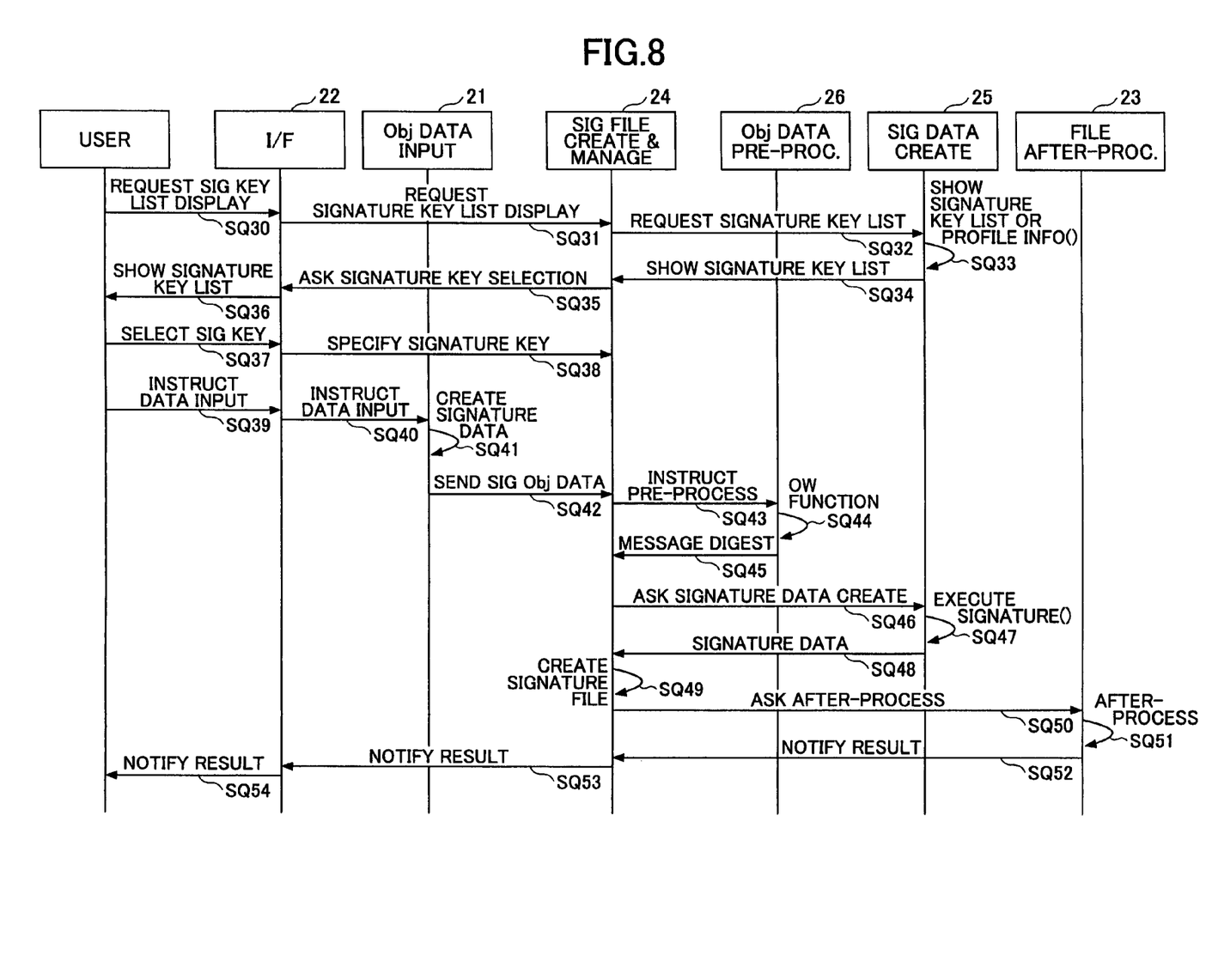
FIG. 8 is a second sequence diagram of the digital signature processing.

Another example of the digital signature processing is shown in FIG. 8, and thus, FIG. 8 is a second sequence diagram of digital signature processing.

First, the user carries the IC card 2 and the paper document to be scanned to the digital multifunction apparatus 1, inserts the IC card 2 into the IC card read/write unit 13.

Next, the user touches a signature key listing request button, or the like, of the operation panel 11 and requests display of the signature key list (sequence SQ30 of FIG. 8).

Upon request of the user for display of the signature key list, the interface part 22 notifies to the signature file creation managing part 24 that display of the signature key list is requested by the user (sequence SQ31 of FIG. 8).

Upon reception of notification from the interface part 22 that display of the signature key list was requested by the user, the signature file creation managing part 24 delivers a signature key listing request for calling the signature key list presentation method or the signature key profile information presentation method of the object (or card application) inside the IC card 2 to the signature data creation part 25 via the IC card read/write unit 13 (sequence SQ32 of FIG. 8).

In the case the IC card 2 has the construction shown in FIG. 4, the signature data creation part 25 executes, in response to reception of the signature key listing request from the signature file creation managing part 24, the signature key list presentation method of the corresponding object (or card application) (sequence SQ33 of FIG. 8), and collects the profile information from the signature key set of the corresponding object (or card application). Further, the signature data creation part 25 presents the signature key list the profile information thus collected to the signature file creation managing part 24 (sequence SQ34 of FIG. 8).

On the other hand, in the case the IC card 2 has the construction shown in FIG. 5, the signature data creation part 25 executes, upon reception of the signature key listing request from the signature file creation managing part 24, the signature key profile information presentation method of corresponding plural objects (or card applications) (sequence SQ33 of FIG. 8), and collects the profile information of the corresponding plural objects (or card applications). Further, the signature data creation part 25 presents the profile information thus collected to the signature file creation managing part 24 as the signature key list (sequence SQ34 of FIG. 8).

Upon reception of the presentation of the signature key list from the signature data creation part 25, the signature file creation managing part 24 requests selection of the signature key to the interface part 22 (sequence SQ35 of FIG. 8).

Upon reception of the selection request from the signature key more signature file creation managing part 24, the interface part 22 crates the signature key list display screen 31 shown in FIG. 7 and displays the same on the operation panel 11 (sequence SQ36 of FIG. 8).

Thereby, the user refers to the signature key list display screen 31 shown in FIG. 7 and selects an appropriate signature key (sequence SQ37 of FIG. 8).

Upon selection of the signature key by the user, the interface part 22 delivers the profile name of the key selected by the user and/or the identifier of the key to the signature file creation managing part 24 (sequence SQ38 of FIG. 8).

On the other hand, the user sets the paper document on the image scanner 12 after selection of the signature key and switches the digital multifunction apparatus 1 to the scanner mode by using the operation panel 11, for example. Further, the user selects "scan with digital signature option" and starts scanning (sequence SQ39 of FIG. 8).

Upon instruction of data input by the user, the interface part 22 notifies to the object data input part 21 that the data input has been instructed by the user (sequence SQ40 of FIG. 8).

Upon reception of notification that data input has been instructed by the user from the interface part 22, the object data input part 21 reads the paper document set by the user and creates the signature object (sequence SQ41 of FIG. 8). Further, the object data input part 21 delivers the same to the signature file creation managing part 24 (sequence SQ42 of FIG. 8).

The signature file creation managing part 24 expands the signature object data delivered from the object data input part 21 on the RAM 17 and instructs pre-processing to the object data preprocessing part 26 (sequence SQ43 of FIG. 8).

The object data preprocessing part 26 applies a one-way function the signature object data instructed for processing by the signature file creation managing part 24 (sequence SQ44 of FIG. 8), and creates a message digest of that signature object data. Further, the object data preprocessing part 26 expands the message digest on the RAM 17 and returns the message digest to the signature file creation managing part 24 (sequence SQ45 of FIG. 8).

In the sequence SQ38, the signature file creation managing part 24 delivers a signature data creation request, which calls the signature implementation method of the object (or card application) inside the IC card 2 to the signature data creation part 25 via the IC card read/write unit 13 while using the profile name of the key and/or the identifier of the key specified by the user from the interface part 22 and the corresponding message digest held on the on RAM 17 as the parameters (sequence SQ46 of FIG. 8).

Upon reception of the signature data creation request from the signature file creation managing part 24, the signature data creation part 25 executes the signature implementation method of the corresponding object (or card application) on the basis of the parameter (sequence SQ47 of FIG. 8), and returns the signature data to the signature file creation managing part 24 as the result of execution (sequence SQ48 of FIG. 8).

Upon reception of the signature data from the signature data creation part 25, the signature file creation managing part 24 files the signature data and thus creates the signature file (sequence SQ49 of FIG. 8). Further, the signature file creation managing part 24 delivers the request of the post-processing including the signature file, for example, to the after-processing part 23 (sequence SQ50 of FIG. 8).

Upon reception of the request for post-processing from the signature file creation managing part 24, the file after-processing part 23 saves the signature file included in the request of post-processing in a specified location of the hard disk drive 15 (sequence SQ51 of FIG. 8) and notifies the result of the post-processing (completion of saving, for example) to the signature file creation managing part 24 (sequence SQ52 of FIG. 8).

Upon reception of the notification of the result from the file after-processing part 23, the signature file creation managing part 24 notifies the result to the interface part 22 (sequence SQ53 of FIG. 8).

Upon reception of the notification of the result from the signature file creation part 24, the interface part 22 displays the result on the operation panel 11 (sequence SQ54 of FIG. 8).

According to the processing shown in FIG. 8, too, it becomes possible for a single user to provide a digital signature by selectively using plural digital signature keys according to the purposes and situations.

Embodiment 3

Although explanation has been made in Embodiment 1 for the case that the user inserts the IC card 2 into the IC card read/write unit 13 first as shown in FIG. 6, it is also possible for the digital multifunction apparatus 1, to determine whether or not the IC card 2 is inserted into the IC card read/write unit 13 in the stage in which scanning has been completed and the signature processing is going to be started (for example when the signature file creation managing part 24 is going to start the processing of sequence SQ8 of FIG. 6). Thus, when it is determined that the IC card is not inserted, the digital multifunction apparatus may display a request in the operation panel 11, or the like, that that the IC card 2 is to be inserted into the IC card read/write unit 13 and urge the user to insert the IC card 2.

Figure 9:
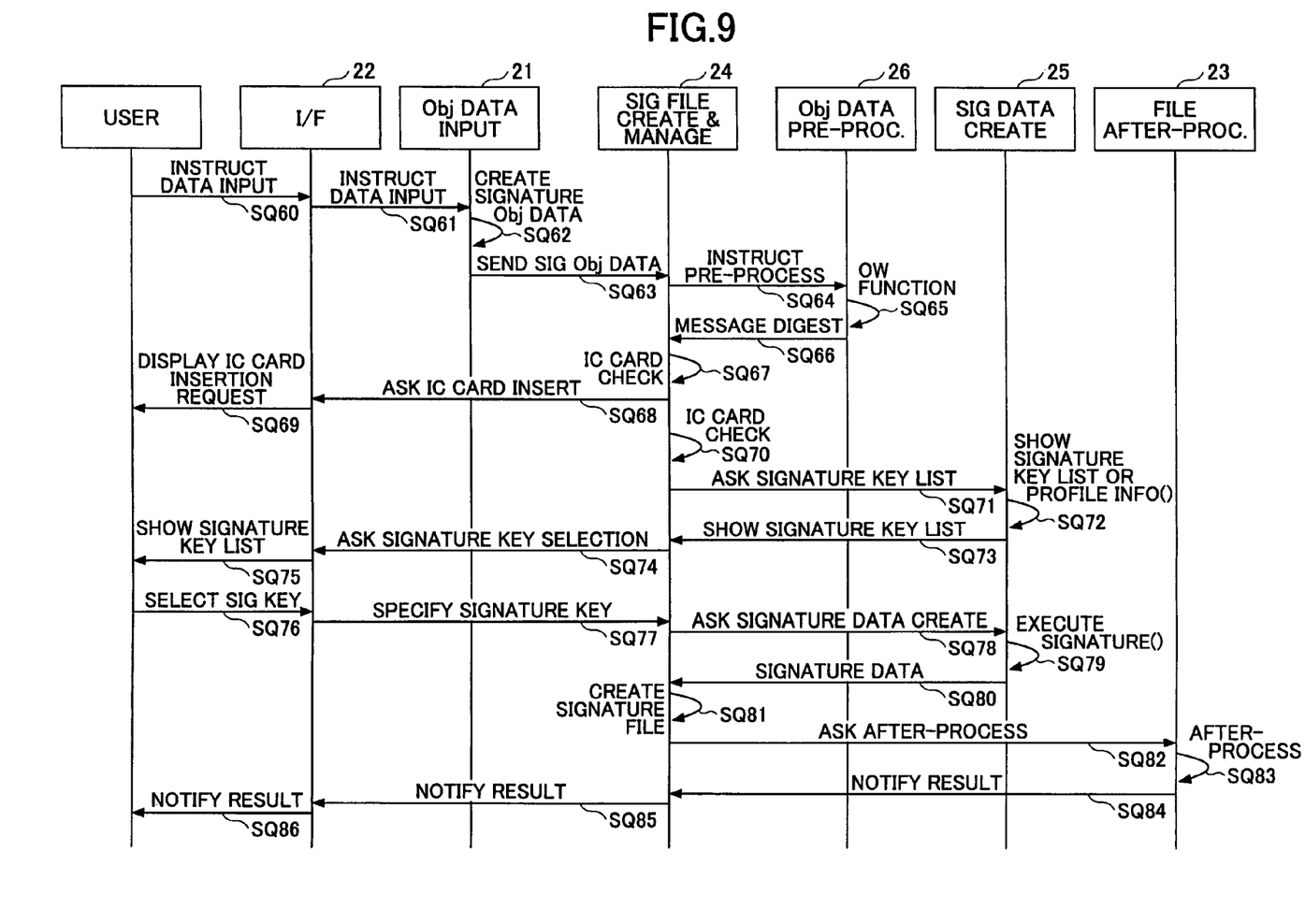
FIG. 9 is a third sequence diagram of the digital signature processing.

Another example of digital signature processing is shown in FIG. 9, wherein it should be noted that FIG. 9 is a third sequence diagram of digital signature processing.

First, the user brings the paper document to be scanned before the digital multifunction apparatus 1 and sets the paper document on the image scanner 12. Further, the user switches the digital multifunction apparatus 1 to the scanner mode by using the operation panel 11, and starts scanning by selecting "scan with digital signature" option (sequence SQ60 of FIG. 9).

When data input is instructed by the user, the interface part 22 notifies to the object data input part 21 that the data input has been instructed by the user (sequence SQ61 of FIG. 9).

Upon reception the notification from the interface part 22 that data input has been instructed by the user, the object data input part 21 reads the paper document set by the user and creates the signature object data (sequence SQ62 of FIG. 9) and delivers the same to the signature file creation managing part 24 (sequence SQ63 of FIG. 9).

The signature file creation managing part 24 expands the signature object data provided from the object data input part 21 on the RAM 17 and instructs the pre-processing to the object data preprocessing part 26 (sequence SQ64 of FIG. 9).

The object data preprocessing part 26 applies the one-way function to the signature object data, of which processing has been instructed by the signature file creation managing part 24 (sequence SQ65 of FIG. 9), creates the message digest of that signature object data, expands the same on the RAM 17, and returns that message digest to the signature file creation managing part 24 (sequence SQ66 of FIG. 9).

Next, the signature file creation managing part 24 determines whether or not the IC card 2 is inserted to IC card read/write unit 13 (sequence SQ67 of FIG. 9). When it is determined that the IC card 2 is not inserted to the IC card read/write unit 13, the signature file creation managing part 24 sends an insertion request of IC card to the interface part 22 (sequence SQ68 of FIG. 9).

Figure 10:
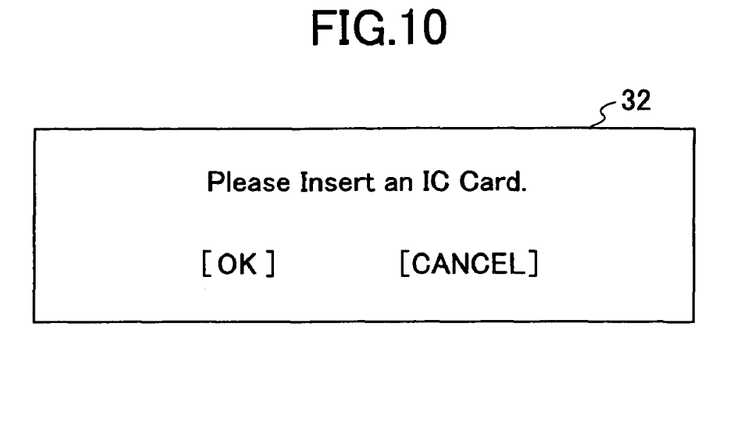
FIG. 10 is a diagram showing an example of an IC card insertion requesting display screen.

Upon reception of the insertion request of IC card from the signature file creation managing part 24, the interface part 22 creates an IC card insertion request display screen 32 as shown in FIG. 10 and shows the same on the operation panel 11 (sequence SQ69 of FIG. 9). FIG. 10 is a drawing showing an example of the IC card insertion request display screen.

As shown in FIG. 10, there is displayed, in the IC card insertion request display screen 32, a request for insertion request of the IC card 2. Thereby, the user refers to the IC card insertion request display screen 32 of FIG. 10 and inserts the IC card 2 into IC card read/write unit 13.

The signature file creation managing part 24 determines whether or not the IC card 2 is inserted into the IC card read/write unit 13 (sequence SQ70 of FIG. 9).

When it is determined that the IC card 2 is inserted into the IC card read/write unit 13, the signature file creation managing part 24 delivers the signature key listing request, which calls the signature key list presentation method or the signature key profile information presentation method of the object (or card application) in the IC card 2, to the signature data creation part 25 via the IC card read/write unit 13 (sequence SQ71 of FIG. 9).

When the signature file creation managing part 24 has determined that the IC card 2 is inserted to the IC card read/write unit 13 as a result of the determination in the sequence SQ67 of FIG. 9, the processing from the sequence S68 to the sequence S70 may be omitted.

The processing from the sequence SQ72 to the sequence SQ86 of FIG. 9 are made similarly to the processing from the sequence SQ9 to the sequence SQ23 of FIG. 6.

Embodiment 4

Although it has shown in Embodiment 1 that the signature file creation managing part 24 starts the processing of the sequence SQ8 after receiving the message digest from the object data preprocessing part 26 in sequence SQ7 as shown in FIG. 6, it is not always necessarily to carry out the processing with such an order. Thus, it is possible to configure such that the interface part 22 notifies to the signature file creation managing part 24 that the digital signature is to be provided at the same time as the sequence SQ2 and carry out the processing from the sequence SQ8 to the sequence SQ14 for selection of the signature key, parallel with the sequence SQ3. Alternatively, it is possible to carry out the processing from the sequence SQ8 to the sequence SQ14 parallel with the processing from the sequence SQ5 to the sequence SQ7 for pre-processing.

Embodiment 5

Figure 11:
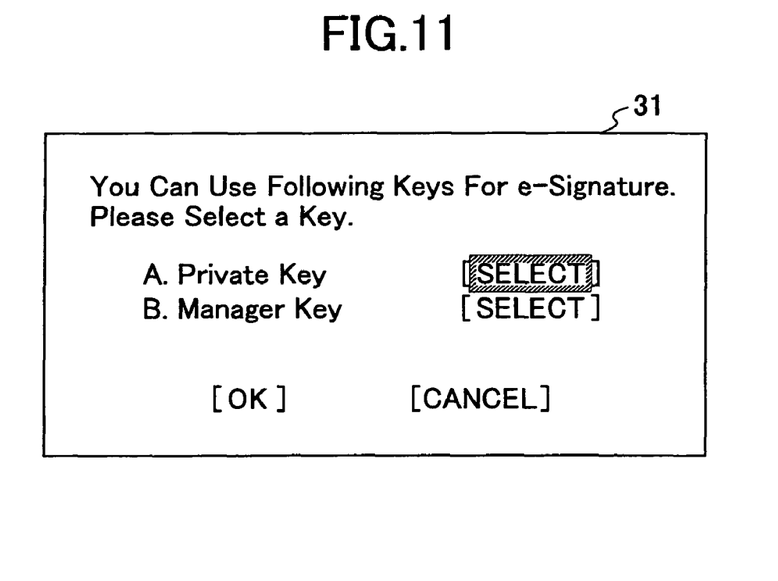
FIG. 11 is a second diagram showing the signature key listing display screen.

Although it has been configured in Embodiment 1 that the interface part 22 creates the signature key list display screen 31 such that plural signature keys are arranged equally for urging the user for selection the signature key based on the returned value of the signature key list presentation method received through the signature file creation managing part 24 as shown in FIG. 7, it is possible to create the signature key list display screen 31 in which a default signature key is already selected as shown in FIG. 11 and urge the user for selection of a signature key.

FIG. 11 is a second diagram showing an example of the signature key list display screen, in which the key for private use is selected as the default signature key.

The default signature key can be implemented by setting a default flag to the profile information included in the signature key set, for example, such that the interface part 22, checking the default flag, defines the signature key in which the default flag is set to the default signature key. Alternatively, it is possible to set an order of priority to the profile information included in the signature key set and cause the interface part 22 to check the order of priority and define the signature key of the highest order of priority as the default signature key.

Embodiment 6

Figure 12:
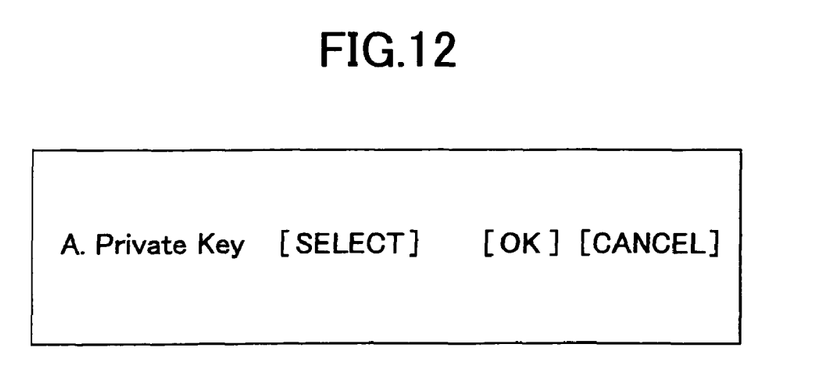
FIG. 12 is a diagram showing an example of signature key list displayed on the display part.

While explanation has been made in Embodiment 1 for the case of using a liquid crystal display, or the like, for the operation panel 11, there can be a case in which the display part can display only one or two lines depending on the type of the digital multifunction apparatus 1. In the case the display part can make only a simple display, the interface part 22 does not create the signature key list display screen 31 shown in FIG. 7 and displays the signature key list one line by one line in the display part as shown in FIG. 12. It should be noted that FIG. 12 shows an example of the signature key list displayed on such a display part. As can be seen in FIG. 12, the display part displays one signature key (or single piece of profile information) in the signature key list (or the list of profile information).

Embodiment 7

While the user selected the signature key in Embodiment 1 by using the signature key list display screen 31 displayed by the interface part 22 in the operation panel 11 as shown in FIG. 7, it is also possible to configure that the user inputs profile information in the operation panel 11, or the like, requests creation of the signature data. Thereby, it is possible to configure such that the signature file creation managing part 24, upon acquisition of the profile information via the interface part 22, delivers the signature data creation request, which calls the signature execution method of the object (or card application) inside the IC card 2 while using the profile information and the corresponding message digest held in the RAM 17 as parameter, to the signature data creation part 25 via the IC card read/write unit 13. Upon reception of the signature data creation request from the signature file creation managing part 24, the signature data creation part 25 executes the signature implementation method of the corresponding object based on the parameter.

Embodiment 8

In FIG. 6 of Embodiment 1, the digital signature processing has been explained for the example in which a paper document is read from the image scanner 12, while other inputting method can be used, provided that it is possible to develop the data to be provided with digital signature on the RAM 17. For example, it is possible to read out the electronic document stored in the electronic document storage server, or the like, connected to the digital multifunction apparatus 1 via a network and expand the same on the RAM 17. Alternatively, it is possible to read out the electronic document stored on the hard disk drive 15, or the like, of the digital multifunction apparatus 1 and develop the same on the RAM 17. In the case of reading out such stored electronic document, the user specifies the desired electronic document to be provided with the digital signature by using the operation panel 11, or the like.

Embodiment 9

While explanation has been made in FIG. 6 of Embodiment 1 that the signature file is saved in the hard disk drive 15 of the digital multifunction apparatus 1 in the post-processing conducted by the file after-processing part 23, saving is not necessarily be done in the hard disk drive 15 of the digital multifunction apparatus 1.

Thus, saving may be made in the recording medium inserted to the media drive 18 of the digital multifunction apparatus 1 or alternatively in a file control server, or the like, connected to the digital multifunction apparatus 1 via a network.

According to various embodiments explained heretofore, it becomes possible with the present invention that a single user can use plural digital signature keys according to the objects and situations.

Further, according to the present invention, it becomes possible to use plural digital signature keys with a single IC card.

Further, while explanation has been made on preferred embodiments of the present invention, the present invention is not limited to such specific embodiments and various modifications and variations are possible within the scope of the present invention.

For example, while explanation has been made for the case of using the digital multifunction apparatus 1 in the embodiment above, the present invention is not limited to such a digital multifunction apparatus 1 and it is possible to use a construction having an equivalent function such as a personal computer connected with a scanner apparatus and attached with the IC card 2.

In any of the cases of using the digital multifunction apparatus 1 or personal computer, there is no need of implementing the signature data creation part 25 in the form of the IC card 2. Thus, in place of the IC card 2, it is possible to use a personal information processing apparatus of portable type having a CPU and memory (cellular phones, PDAs, and the like).

Further, it is also possible to implement the signature data creation part 25 on the digital multifunction apparatus 1 or personal computer, without separating from other functions. With such a construction, security of the signature key may become weaker as compared with the case of using the IC card 2, or the like, the part corresponding to the IC card 2 and the IC card read/write unit 13 can be omitted, and the function can be implemented easily.

Also, while explanation has been made in the embodiment mentioned above that a signing application corresponding to the signature data creation part 25 is installed in the IC card 2, it is possible to configure such that the digital multifunction apparatus 1 determines before the sequence SQ8 of FIG. 6 whether or not a signing application corresponding to the signature data creation part 25 is installed in the IC card 2, and, if not, the digital multifunction apparatus 1 downloads the signing application from a server, or the like, that holds the signing application and install the same to the IC card 2.

Further, the present invention is by no means limited to the embodiments described heretofore, but various variations and modifications may be made without departing from the scope of the invention.

The present invention is based on Japanese Priority Application 2004-227909 filed on Aug. 4, 2004, the entire contents of which are incorporated herein as reference.

What is claimed is:

1. A digital signing method in a digital signing apparatus that provides a digital signature to electronic data, comprising:

inputting, with an electronic data input unit in the digital signing apparatus, electronic data to be signed with the digital signature;

storing a plurality of different sets of signature key data in a storage unit, each of the plurality of different sets of signature key data containing a user private key used for the digital signature and attribute information indicating a status of a user to provide a signature corresponding to the user private key;

presenting with a presentation unit in the digital signing apparatus, said attribute information of each of said plurality of different sets of signature key data;

displaying, with a display unit in the digital signing apparatus, said attribute information of each of said plurality of different sets of signature key data to the user;

selecting said attribute information of one set of said plurality of different sets of signature key data;

creating signature data by using both said electronic data and said user private key corresponding to said attribute information selected by the user from said plurality of different sets of signature key data; and saving signature data created or a signature file created based on said signature data in said storage unit.

2. The digital signing method as claimed in claim 1, wherein said displaying shows a list of attribute information according to said presenting.

3. The digital signing method as claimed in claim 2, wherein said displaying selects attribute information of a predetermined signature key data from said list of said attribute information in response to said presenting as a candidate.

4. The digital signing method as claimed in claim 1, wherein said displaying shows said attribute information in response to said presenting to said user one by one.

5. The digital signing method as claimed in claim 1, wherein said presenting and said displaying are carried out before said inputting data.

6. The digital signing method as claimed in claim 1, wherein said presenting and said displaying are carried out after said inputting data.

7. The digital signing method as claimed in claim 1, further comprising:

collecting said attribute information in response to said presenting.

8. The digital signing method as claimed in claim 7, wherein said presenting is carried out by a portable information processing apparatus that can communicate with said digital signing apparatus.

9. The digital signing method as claimed in claim 1, further comprising:

creating said signature data by using electronic data input in said inputting step in response to said creating of signature data; and creating another signature data corresponding to another attribute information displayed in said display unit.

10. The digital signing method as claimed in claim 9, wherein said creating of signature data is carried out by a portable information processing apparatus which communicates with said digital signing apparatus.

11. A digital signing apparatus that provides a digital signature to electronic data, comprising:

a signature object data input unit configured to input data to be signed with digital signature;

a storage unit configured to store a plurality of different sets of signature key data each of the plurality of different sets of signature key data containing a user private key used for the digital signature and attribute information indicating a status of a user to provide a signature corresponding to the user private key;

a signature key display unit configured to display said attribute information of each of said plurality of different sets of signature data to the user;

a digital signature creation and management unit configured to create and manage a digital signature file based on signature data created by using both said electronic data inputted in said signature object data inputting unit and said user private key corresponding to said attribute information of one set of said plurality of different sets of signature key data selected by the user from said plurality of different sets of signature key data; and a signature data saving unit configured to save said signature data created in said digital signature file creation and managing unit in said storage unit.

12. The digital signing apparatus as claimed in claim 11, wherein said signature key display unit displays a list of said attribute information.

13. The digital signing apparatus as claimed in claim 12, wherein said signature key display unit selects said attribute information of one signature key data from said list of said attribute information as a candidate and displays said candidate to said user.

14. The digital signing apparatus as claimed in claim 11, wherein said signature key display unit displays said attribute information to said user one by one.

15. The digital signing apparatus as claimed in claim 11, further comprising a signature data creation unit configured to create said signature data by using electronic data input in said signature object data input unit and said private key corresponding to said attribute information selected by said user from said plurality of different sets of attribute information displayed by said signature key display unit.

16. The digital signing apparatus as claimed in claim 15, wherein said signature data creation unit collects said attribute information in response to a request and shows said attribute information to said user.

17. A portable information processing apparatus capable of communicating with a digital signing apparatus that provides digital signature to electronic data, comprising:

a signature data creation unit configured to collect and present, in response to a request from said digital signing apparatus, a plurality of different sets of signature key data, each of the plurality of different sets of signature key data containing a user private key used for the digital signature and attribute information indicating a status of a user to provide a signature corresponding to the user private key, said attribute information of each of said plurality of different sets of signature key data being displayed to a user in said digital signing apparatus, said signature data creation unit, configured to acquire, in response to a creation request from said digital signing apparatus including said electronic data and said user private key corresponding to said attribute information of one set of said plurality of different sets of signature key data selected by the user from said plurality of different sets of signature key data, said user private key from a signature key recording unit, said signature data creation unit creating signature data based on both said user private key and said electronic data.

18. The portable information processing apparatus as claimed in claim 17, wherein said portable information processing apparatus is an IC card.

19. The portable information processing apparatus as claimed in claim 18, further comprising:

a signature data preparation unit formed of a single IC card application implemented in said IC card.

20. The portable information processing apparatus as claimed in claim 18, wherein said IC card is a multiple application IC card, and said signature data preparation unit is formed of plural IC card applications implemented in said multiple application IC card.

21. A digital signing system comprising a digital signing apparatus that provides digital signature to electronic data and a portable information processing apparatus capable of communicating with said digital signing apparatus, said digital signing apparatus comprising:

a signature object data inputting unit configured to input data to be signed with a digital signature;

a storage unit configured to store a plurality of different sets of signature key data, each of the plurality of different sets of signature key data containing a user private key used for the digital signature and attribute information indicating a status of a user to provide a signature corresponding to the user private key;

a signature key displaying unit configured to display said attribute information of each of said plurality of different sets of signature key data to the user;

a digital signature creation and managing unit configured to create and manage a digital signature file based on signature data created by using both said electronic data inputted in said signature object data inputting unit and said user private key corresponding to said attribute information of one set of said plurality of different sets of signature key data selected by the user from said plurality of different sets of signature key data; and a signature data saving unit configured to save said signature data created in said digital signature file creation and managing unit in said storage unit, said portable information processing apparatus comprising a signature data creation unit, said signature data creation unit acquiring, in response to a creation request from said digital signing apparatus including said electronic data and said user private key corresponding to said attribute information of one set of said plurality of different sets of signature key data selected by the user from said plurality of different sets of signature key data, said user private key from a signature key recording unit, said signature data creation unit creating signature data based on both said user private key and said electronic data.

22. A computer-readable medium encoded with instructions, which when executed by a digital signing apparatus causes the digital signing apparatus to implement a method comprising:

inputting, with an electronic data input unit in the digital signing apparatus, electronic data to be signed with the digital signature;

storing a plurality of different sets of signature key data in a storage unit, each of the plurality of different sets of signature key data containing a user private key used for the digital signature and attribute information indicating a status of a user to provide a signature corresponding to the user private key;

presenting with a presentation requesting unit in the digital signing apparatus, said attribute information of each of said plurality of different sets of signature key data;

displaying, with a display unit in the digital signing apparatus, said attribute information of each of said plurality of different sets of signature key data to the user;

selecting said attribute information of one set of said plurality of different sets of signature key data;

creating signature data by using both said electronic data and said user private key corresponding to said attribute information selected by the user from said plurality of different sets of signature key data; and saving signature data created or a signature file created based on said signature data in said storage unit.

23. A computer-readable medium encoded with instructions, which when executed by an information processing apparatus causes the information processing apparatus to implement a method comprising:

collecting and presenting, in response to a request from a digital signing apparatus, a plurality of different sets of signature key data, each of the plurality of different sets of signature key data containing a user private key used for the digital signature and attribute information indicating a status of a user to provide a signature corresponding to the user private key, said attribute information of each of said plurality of different sets of signature key data being displayed to a user in said digital signing apparatus;

acquiring, in response to a creation request including electronic data and said user private key corresponding to said attribute information of one set of said plurality of different sets of signature key data selected by the user from said plurality of different sets of signature key data, said user private key from a signature key recording unit; and creating signature data based on both said user private key and said electronic data.

24. The digital signing method as claimed in claim 1, wherein said status of said user to provide said signature contains information indicating whether the signature key data is a signature key data of the user as an individual person or a signature key data of the user as a post in an office.

* * * * *